United States Patent
Shao et al.

(10) Patent No.: US 10,983,209 B2
(45) Date of Patent: Apr. 20, 2021

(54) ACCURATE SIGNAL COMPENSATIONS FOR UWB RADAR IMAGING IN DISPERSIVE MEDIUM

(71) Applicant: ELLUMEN, INC., Arlington, VA (US)

(72) Inventors: Wenyi Shao, Laurel, MD (US); William J. McCollough, Earlysville, VA (US); Todd R. McCollough, Barrington, IL (US)

(73) Assignee: ELLUMEN, INC., Silver Spring, MD (US)

( * ) Notice: Subject to any disclaimer, the term of this patent is extended or adjusted under 35 U.S.C. 154(b) by 388 days.

(21) Appl. No.: 15/950,496

(22) Filed: Apr. 11, 2018

(65) Prior Publication Data
US 2018/0299544 A1 Oct. 18, 2018

Related U.S. Application Data
(60) Provisional application No. 62/484,512, filed on Apr. 12, 2017.

(51) Int. Cl.
| | |
|---|---|
| G01S 13/89 | (2006.01) |
| G01S 13/02 | (2006.01) |
| G01S 13/88 | (2006.01) |
| G01S 7/295 | (2006.01) |

(52) U.S. Cl.
CPC ............. *G01S 13/89* (2013.01); *G01S 7/295* (2013.01); *G01S 13/0209* (2013.01); *G01S 13/887* (2013.01)

(58) Field of Classification Search
CPC .... G01S 13/89; G01S 13/0209; G01S 13/887; G01S 7/295

USPC .......................................................... 342/22
See application file for complete search history.

(56) References Cited

U.S. PATENT DOCUMENTS

| | | | | |
|---|---|---|---|---|
| 3,641,350 A | * | 2/1972 | Petropoulas | G01J 5/52 356/124.5 |
| 5,173,880 A | * | 12/1992 | Duren | G01V 1/282 367/21 |
| 5,812,629 A | * | 9/1998 | Clauser | A61B 6/466 378/62 |
| 6,216,540 B1 | * | 4/2001 | Nelson | A61B 5/0091 73/633 |

(Continued)

FOREIGN PATENT DOCUMENTS

| | | | | |
|---|---|---|---|---|
| WO | WO-2008057286 A2 | * | 5/2008 | ............ H01Q 21/29 |
| WO | WO-2011048192 A1 | * | 4/2011 | ............ G01S 13/87 |
| WO | WO-2011048194 A1 | * | 4/2011 | ........... G01S 13/003 |

OTHER PUBLICATIONS
W. Shao et al, A Time-Domain Measurement System for UWB MW Imaging, IEEE Transactions on Microwave Theory and Techniques, No. 99, pp. 1-11, Feb. 2018.

(Continued)

*Primary Examiner* — Peter M Bythrow
*Assistant Examiner* — Nuzhat Pervin
(74) *Attorney, Agent, or Firm* — Foley & Lardner LLP

(57) ABSTRACT

A system for producing an image includes a MW (microwave) transmitter, configured to transmit a MW towards an object, and a MW receiver, configured to detect a MW signal received from the object. A processor is programmed to produce an image of the object by compensating both phase shifts and amplitude losses for frequency dependency in a plurality of detected MW signals.

15 Claims, 7 Drawing Sheets

(56) References Cited

U.S. PATENT DOCUMENTS

| | | | | |
|---|---|---|---|---|
| 6,246,355 B1* | 6/2001 | Miceli | G01S 7/412 | 342/175 |
| 6,445,334 B1* | 9/2002 | Bradley | G01S 7/20 | 342/195 |
| 6,621,448 B1* | 9/2003 | Lasky | G01V 3/12 | 342/118 |
| 7,280,068 B2* | 10/2007 | Lee | G01S 7/2813 | 342/179 |
| 7,869,057 B2* | 1/2011 | De Groot | G01B 9/0209 | 356/511 |
| 9,869,641 B2 | 1/2018 | McCollough et al. | | |
| 9,986,934 B2* | 6/2018 | Lux | A61B 5/0507 | |
| 2005/0264813 A1* | 12/2005 | Giakos | B82Y 20/00 | 356/369 |
| 2007/0013575 A1* | 1/2007 | Lee | G01S 7/2813 | 342/52 |
| 2007/0075889 A1* | 4/2007 | Sheen | G01S 13/89 | 342/22 |
| 2008/0100510 A1* | 5/2008 | Bonthron | H01Q 21/061 | 342/373 |
| 2008/0180336 A1* | 7/2008 | Bauregger | H01Q 19/062 | 343/753 |
| 2010/0176789 A1* | 7/2010 | Zoughi | G01R 27/28 | 324/76.13 |
| 2010/0207836 A1* | 8/2010 | Cortes-Medellin | H01Q 11/10 | 343/792.5 |
| 2011/0298652 A1* | 12/2011 | Yanagihara | G01S 13/003 | 342/146 |
| 2011/0304498 A1* | 12/2011 | Yanagihara | G01S 7/414 | 342/70 |
| 2012/0083683 A1* | 4/2012 | Kuwabara | A61B 90/17 | 600/407 |
| 2013/0016003 A1* | 1/2013 | Stirling-Gallacher | G01S 13/89 | 342/174 |
| 2014/0333929 A1* | 11/2014 | Sung | G01N 15/1434 | 356/341 |
| 2015/0208945 A1* | 7/2015 | Lux | A61B 5/113 | 600/430 |
| 2016/0007859 A1* | 1/2016 | Arbabian | A61B 5/0093 | 600/407 |
| 2017/0131399 A1* | 5/2017 | Ioannidis | G01S 13/89 | |
| 2017/0160419 A1* | 6/2017 | Kuznetsov | G01V 3/12 | |
| 2017/0356995 A1 | 12/2017 | Shao et al. | | |
| 2018/0011180 A1* | 1/2018 | Warnick | G01S 13/06 | |
| 2018/0059237 A1* | 3/2018 | Liu | G01S 13/90 | |
| 2018/0156850 A1* | 6/2018 | Wyatt | G01R 23/16 | |
| 2020/0182993 A1* | 6/2020 | Awazu | G01S 13/878 | |

OTHER PUBLICATIONS

W. Shao et al., A Phase Confocal Method for MW Near-Field Imaging, IEEE Transactions Microwave Theory Techniques, vol. 65, No. 7, pp. 2508-2515, Jul. 2017.

W. Shao et al., A Phase Shift and Sum Method for UWB Radar Imaging in Dispersive Media, submitted to IEEE Trans. Antennas Propag. on Feb. 20, 2018.

W. Shao et al., Multiple-GPU-Based Frequency-Dependent Finite-Difference Time Domain Formulation Using MATLAB Parallel Computing Toolbox, Progress in Electromagnetics Research M, vol. 60, pp. 93-100, 2017.

* cited by examiner

ACCURATE SIGNAL COMPENSATIONS FOR UWB RADAR IMAGING IN DISPERSIVE MEDIUM

This application claims priority to U.S. Provisional Application No. 62/484,512, filed on Apr. 12, 2017, whose entire contents are incorporated herein by reference.

BACKGROUND

The present disclosure pertains generally to ultra-wide band (UWB) imaging radar technology. Applications can be non-destructive testing, underground surveillance and ground-penetrating radar such as landmine detection, and invasive medical diagnosis.

The UWB radar technology aims to detect the existence, location, and profile of an object by sending out a UWB electromagnetic (EM) pulse, and post-processing the echo signal (scattered field) from the object. By estimating the time shift (delay) between the transmitted pulse and the echo, the range D from the object to a radar antenna is solved by the equation $$D = \frac{v \cdot \Delta t}{2},$$

where v is the propagation speed of the EM signal. The 3-D position of the object in the space may be found when a time shift is measured from multiple different places in the space.

To reveal the object's size, shape, and location, a radar system must provide high resolution. Generally speaking, resolution depends on an aperture of the radar antenna array, and the bandwidth of the applied EM pulse. A large-aperture antenna array (which may need many antenna elements) provides a good cross resolution; and a broad bandwidth provides a high range resolution (as illustrated in FIG. 1). That is the reason a wideband signal and a large antenna array are desired in imaging radar.

From the point of view in the time domain, UWB indicates a very narrow pulse in duration. Short-time pulses are helpful to accurately find out the time shift between the transmitted pulse and the echo pulse, which results in a good space resolution of the object. A typical radar imaging approach is delay and sum (DAS). DAS (and many of its extensions and variations) firstly compensates the time shift of the received pulse in order to back-propagate the signal from the receiver position to a field point (this will be done for all the antennas), and then sum the signal acquired by all antennas to compute a pixel value for the field point. This calculation will be executed for all field points in the region of interest in order to obtain an image. FIG. 2 illustrates the area of interest in the near field of antennas. The area is meshed into many grids. Each grid is imagined as a field point like 201 outside the object and field points like 202 inside the object. For each field point, it is imagined that the wave propagates from a transmitter 203 to the current field point and a scattering occurs, then the scattered wave is acquired by a receiver 204. The receiver and transmitter may be located at the same position. As the signal is a narrow pulse, the object 205 edge against the background medium is found. The signals where an object is present are expected to sum coherently and the signals where an object is not present are expected to sum incoherently. More details about the DAS algorithm are in references [1] to [5]. DAS is also a traditional method for synthetic aperture radar (SAR) imaging, in which technology the transmission/reception system is mounted on a moving platform, e.g. aircraft or satellites, and the target to be detected is in the far field (on the earth) as discussed in references [6] and [7]. The entire contents of these publications [1] to [7] are incorporated herein by reference for such DAS and SAR techniques as well as systems, methods and other techniques related to microwave (MW) imaging.

SUMMARY OF THE INVENTION

Materials are known to be dispersive (dielectric mechanisms of common materials are shown in FIG. 3) (see reference [8]), more or less, at MW frequencies, meaning the dielectric properties of materials vary with frequencies. In ground penetrating radar (GPR) and underground surveillance, soil, sands, etc. are dispersive, as discussed in reference [9]. In biomedical electromagnetic imaging, all the human tissues are highly dispersive, as discussed in references [10]-[12]. Dispersions lead to a multi-speed, multi-path, and multi-decay phenomenon in the UWB wireless signal, causing the time shift of the signal to be very difficult to be estimated, and hence result in an image quality degradation when conventional radar methods are used.

The present inventive concept, titled phase shift and sum (PSAS), is a novel radar imaging approach which considers the dispersion and loss of the medium as a UWB wave propagates. PSAS takes account of the propagation speed, path, and decay of each frequency component in a UWB pulse individually. The time-shift evaluation in conventional methods is replaced by a phase-shift evaluation between the sensor and the object at each frequency involved. To accurately estimate and compensate the phase shift for each frequency, the phase center of the antenna (used as the sensor's location, which is frequency dependent) and the frequency-dependent index of refraction is utilized to estimate the propagation path; the phase speed of each frequency component is employed; and the energy absorption in the medium is also individually compensated for each frequency component. Therefore, the pulse shape that is distorted in the dispersive medium can be recovered, yielding image quality improvement in radar image reconstruction.

DESCRIPTION OF EMBODIMENTS OF THE INVENTION

Overview

An image of an object within a material (such as an object within a human body or an object underground) is generated using microwaves. As discussed below, in many materials, such as human tissues, low-frequency MW (microwave) signals propagate slower than high-frequency MW signals, but high-frequency MW signals attenuate more rapidly than low-frequency MW signals. This causes both the phase shift and attenuation from a transmitter to a region of interest (a pixel) and from the region of interest to a receiver to be frequency dependent. As will be discussed below, this causes a loss of image quality.

The present invention improves image quality by compensating for this frequency dependence. In embodiments of the invention, a UWB microwave (MW) is transmitted from a transmitter towards an object in a medium and the scattered field is measured by a receiver. Received signals are processed by a processor (such as a computer programmed (using, for example, MATLAB) to perform the algorithms set forth herein), vector network analyzer (VNA), and/or oscilloscope. The processor contains a memory storing software and also data, such as attenuation/absorption data for the material(s) through which the microwaves pass.

Each pixel in a region is examined algorithmically. For each pixel, a propagation distance from the transmitter, to the pixel, and then to the receiver is calculated. Then a phase shift is calculated for each pixel, the phase shift being $2n$ times the propagation distance divided by the wavelength. The phase shift is calculated individually for each of a plurality of discrete frequencies, and thus the phase shift is frequency compensated. The phase shift may be greater than $2\pi$ (or 360°).

Absorption of a MW in a material is frequency dependent, as mentioned above. The frequency dependent absorption data is stored in memory. Because the propagation distance of the MW through the material is known for each pixel, and because absorption is based on propagation distance, the absorption for each pixel at each of the plurality of frequencies, can be computed using this data. Thus, a compensation can be made to minimize or eliminate the frequency dependence of the absorption.

For each pixel, the measured scattered field, compensated for the frequency dependent phase shift and absorption, at all of the plurality of discrete frequencies, are combined (for example, summed) to generate a value of that pixel in the image.

DETAILED DESCRIPTION

Figure 1:
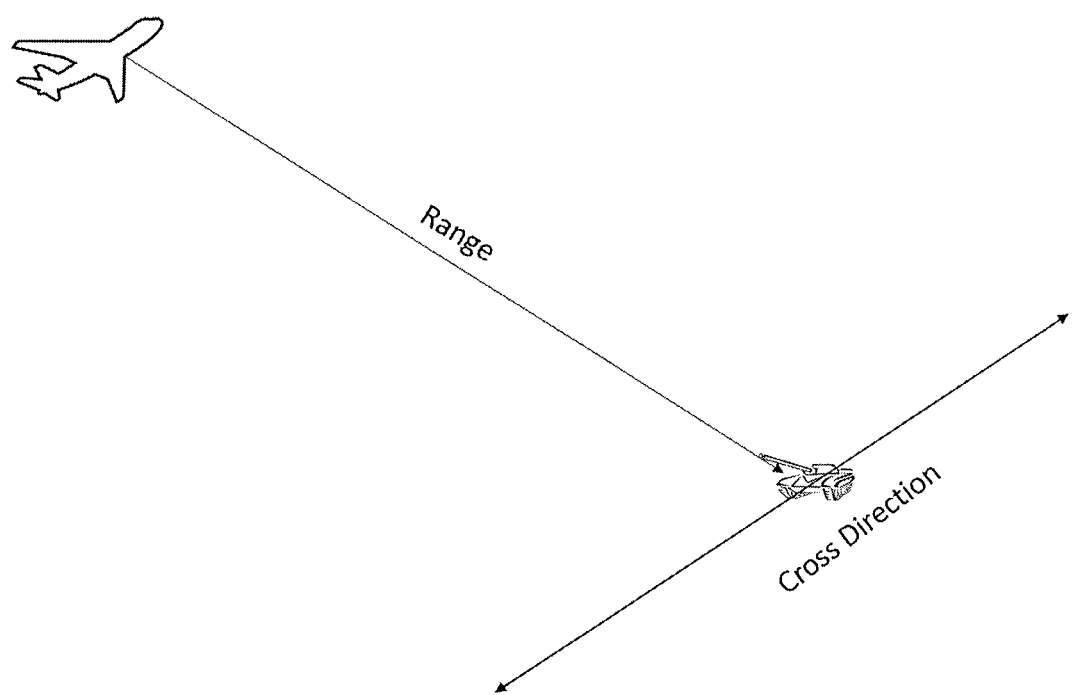
FIG. 1 is used to explain interpretation of range resolution and cross resolution.
Figure 2:
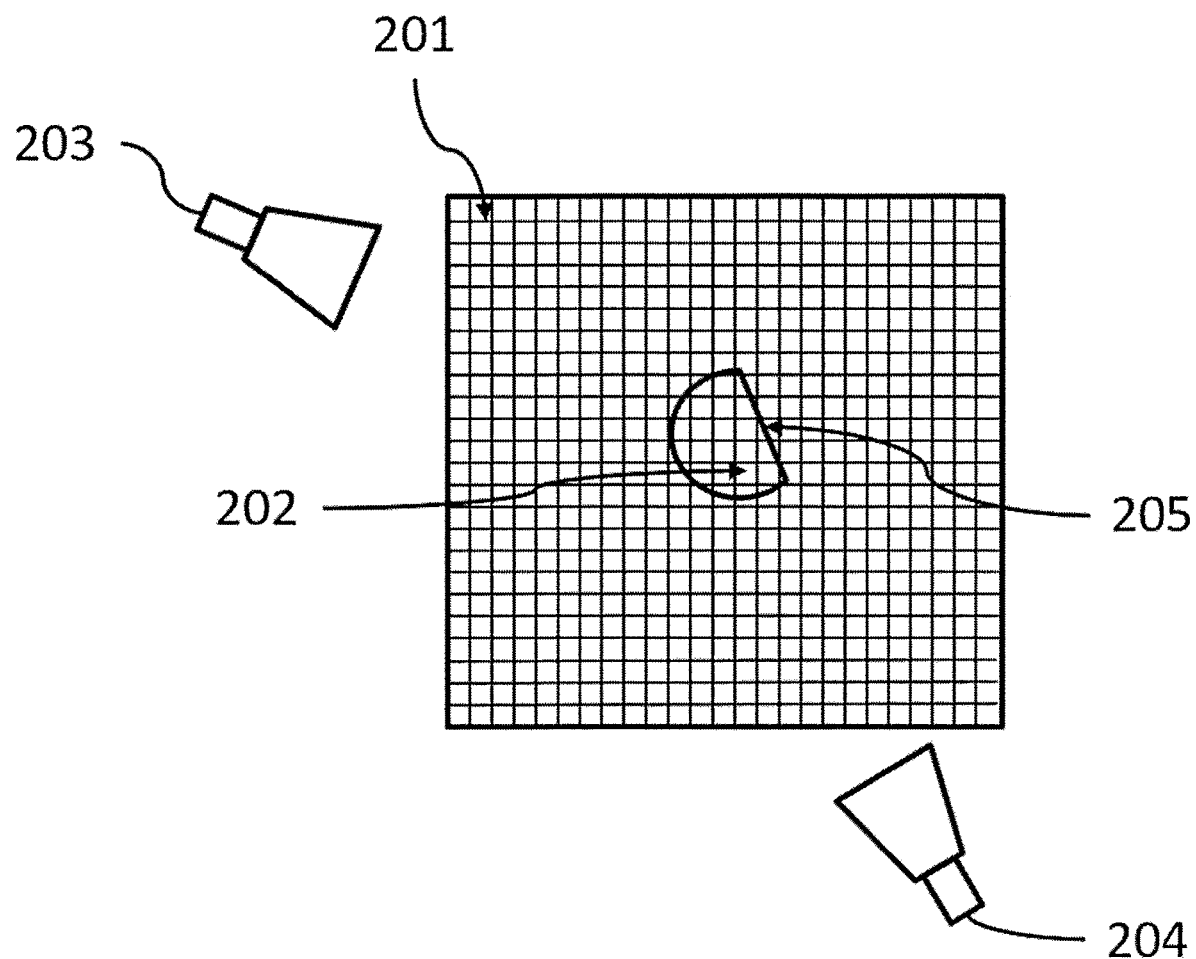
FIG. 2 is used to explain region of interest which is meshed by grids.
Figure 3:
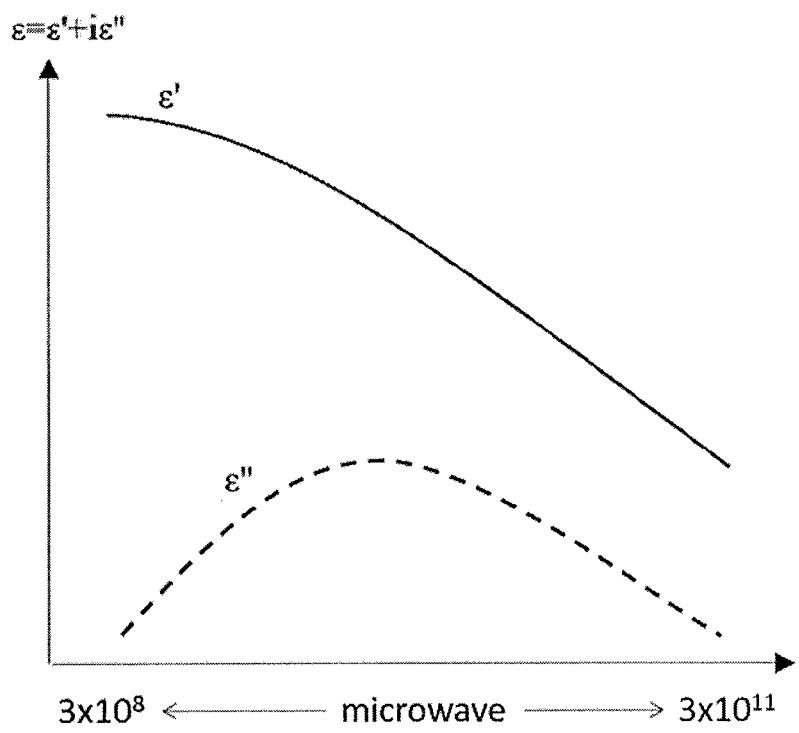
FIG. 3 is used to explain material permittivity varies with frequency.
Figure 4:
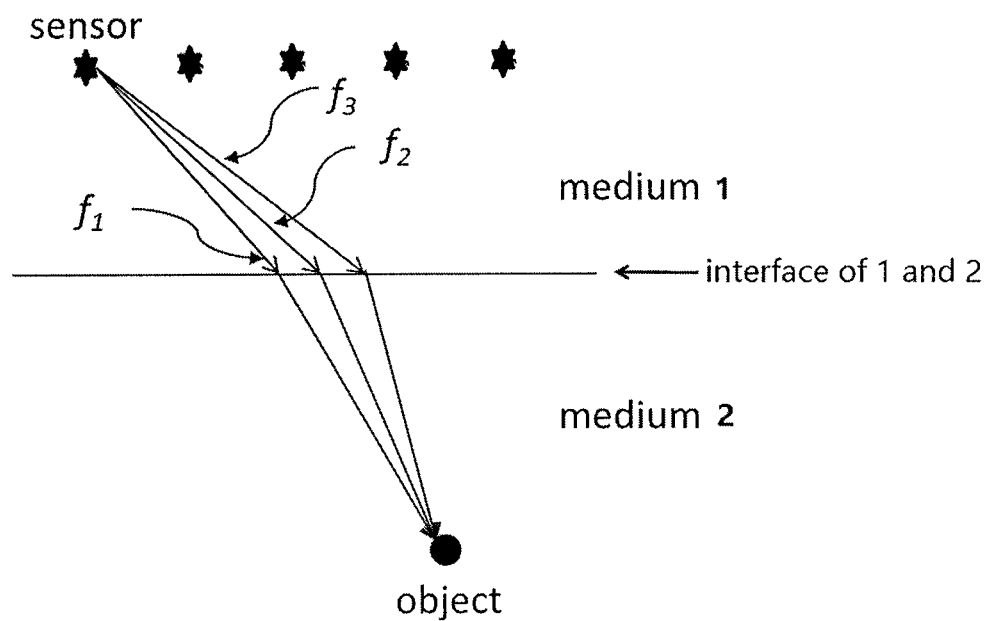
FIG. 4 is used to explain geometry of the problem of invasive MW detection in a dispersive medium.

Due to the dispersive property, the propagation velocity in a medium (which is called phase velocity) varies with frequency. As shown in FIG. 4, the object under test is embedded in a lossy and dispersive Medium 2. Sensors which send UWB signals for detection are placed in a dielectrically light Medium 1, for instance, the air. A UWB pulse that contains many frequency components, frequency $f_1, f_2, f_3 \ldots$ may take different paths and travel with different velocities as they reach the same destination, and their decays are also different. Conventional radar approaches evaluating time shift between the sensor and object are unable to take the dispersion issue into account. They assume the entire pulse (all frequencies) travel together with the same speed and same path. A phase confocal method (PCM) described in references [13] and [14] processes all frequency components individually in the frequency domain. The PCM calculates and compensates the phase shift between the transmitted signal and the echo signal, providing a more accurate way to evaluate the range and localize the object. But PCM does not consider amplitude attenuation in the signal. In fact, it discards amplitude information and uses only phase information to form images, leading to a questionable robustness when an object is in a very lossy and dispersive medium.

The present approach can reconstruct better MW images for objects existing in a lossy and dispersive medium. The intensity of a pixel in the reconstructed image can be evaluated by the equation $$P = \int_{f_L}^{f_H} \left| \sum_{Ch=1}^{M \times N} e^{j\tilde{k}\vec{R}} \cdot V_n(f) \right|^2 df \quad (1)$$

Where V is the measured scattered field of the object at frequency f between the lowest frequency $f_L$ and highest frequency $f_H$ in the UWB signal ($f_L < f < f_H$). In an embodiment, a vector network analyzer (VNA) measures the scattered field of the object in the form of S parameters (in the frequency domain). The term $e^{j\tilde{k}\vec{R}}$ compensates the phase shift and degrade in the lossy medium. M and N denotes the number of transmitters and receivers. Measurements can be alternatively conducted in the time domain. In an embodiment, an oscilloscope or customized receivers records the scattered field of the object in the time domain and then a Fourier transform is performed to achieve the frequency responses. $\tilde{k}$ is a complex wave number which is a function of frequency (f or $\omega$, $\omega=2\pi f$)

$$\tilde{k} = k - jK \quad (2)$$

$$k = \omega \sqrt{\frac{\varepsilon\mu}{2}} \left[ \sqrt{1 + \left(\frac{\sigma}{\varepsilon\omega}\right)^2} + 1 \right]^{\frac{1}{2}} \quad (3)$$

$$K = \omega \sqrt{\frac{\varepsilon\mu}{2}} \left[ \sqrt{1 + \left(\frac{\sigma}{\varepsilon\omega}\right)^2} - 1 \right]^{\frac{1}{2}} \quad (4)$$

Figure 5:
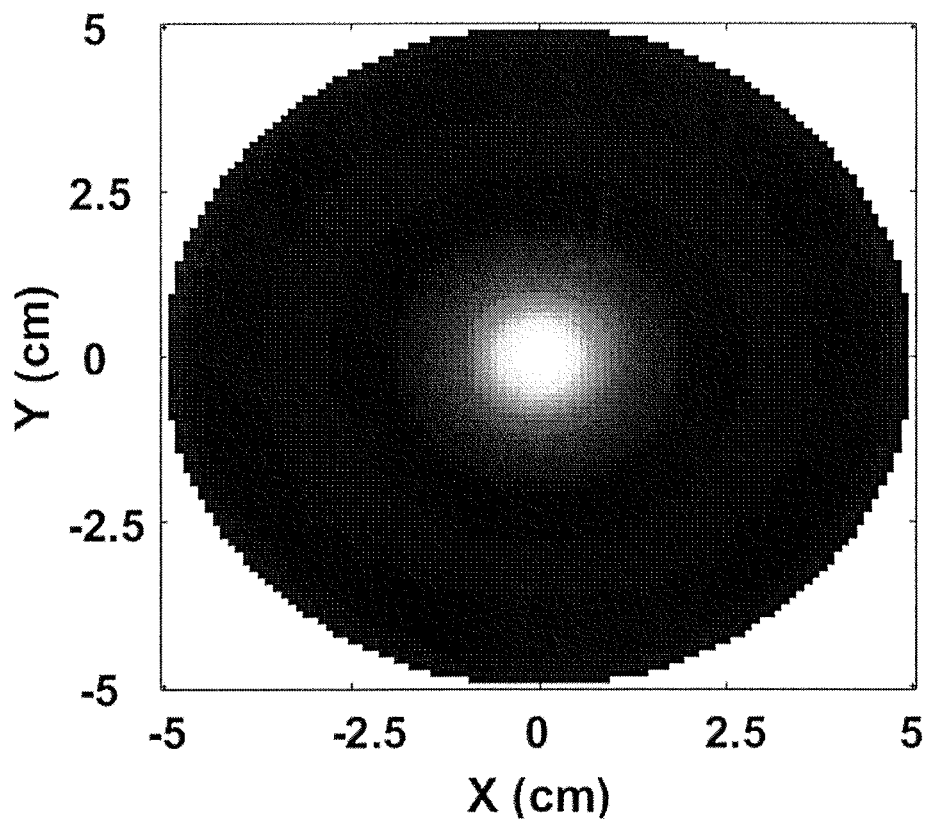
FIG. 5 is used to explain a reconstructed image using the PSAS algorithm which accurately compensates UWB signal phase shifts and losses.

$\varepsilon$ and $\sigma$ are permittivity and conductivity respectively, at frequency f, i.e., $\varepsilon(f)$ and $\sigma(f)$. At MW frequencies, $\mu$ is constant $\mu=4\pi\times10^{-7}$. The imaginary part, K, results in an attenuation of the amplitude of the wave as the wave propagates in the lossy medium. $\vec{R}$ denotes the path that the harmonic wave V(f) propagates in, so it is actually frequency dependent too—$\vec{R}(f)$. M and N represent the number of transmitters and receivers, respectively. The sum can be understood as the square root of power density at a certain frequency for a position in the region of interest. Thus, an integration of the power density over the bandwidth $f_H$-$f_L$ represents the power, which will be converted to a pixel value in the image. An image showing the location and profile of an object is shown in FIG. 5 by processing the data by means of a computational processor.

Figure 6:
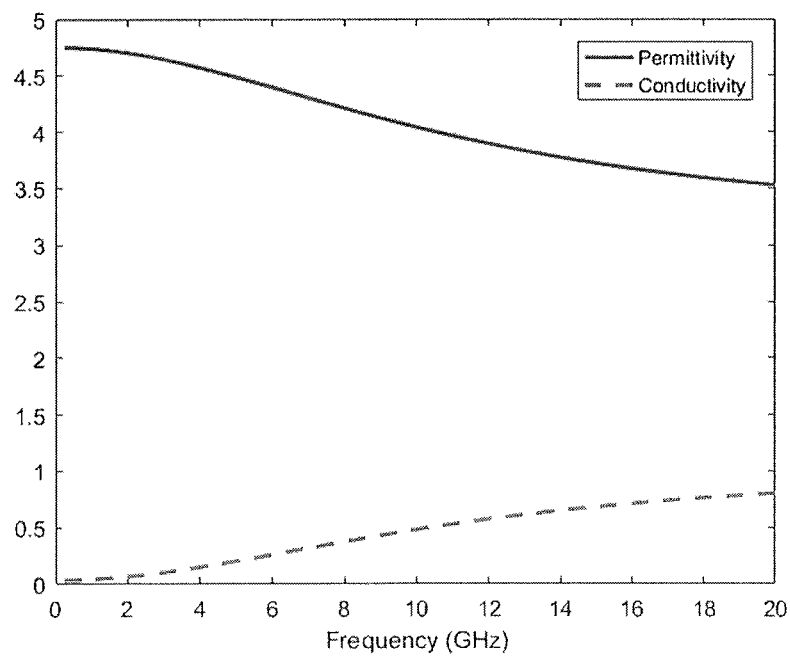
FIG. 6 is used to explain dielectric properties of fatty tissue of breast.

The advantage of the present method over prior art has been experimentally demonstrated in reference [15] via a MW imaging device as described in references [16] and [17]. In this patent specification, we will reveal how the present approach recovers the shape of the pulse to contribute to improving the image. We will simulate a full wave propagating in a dispersive and lossy medium and observe how much it is distorted, and then use the compensation procedure in the present method to recover the signal. The dispersive medium adopted in the example is breast tissue (data group 1 in reference [18], containing 85%-100% adipose tissue). FIG. 6 plots the permittivity and conductivity of the said breast tissue in the frequency range 0.5-20 GHz. FIG. 6 indicates low-frequency components travel with a slower speed than high-frequency components; while high-frequency components attenuate more rapidly than low-frequency components. Simulation is carried out by a software described in reference [19] developed for full wave simulation based on the frequency-dependence finite difference time domain method.

Figure 7A:
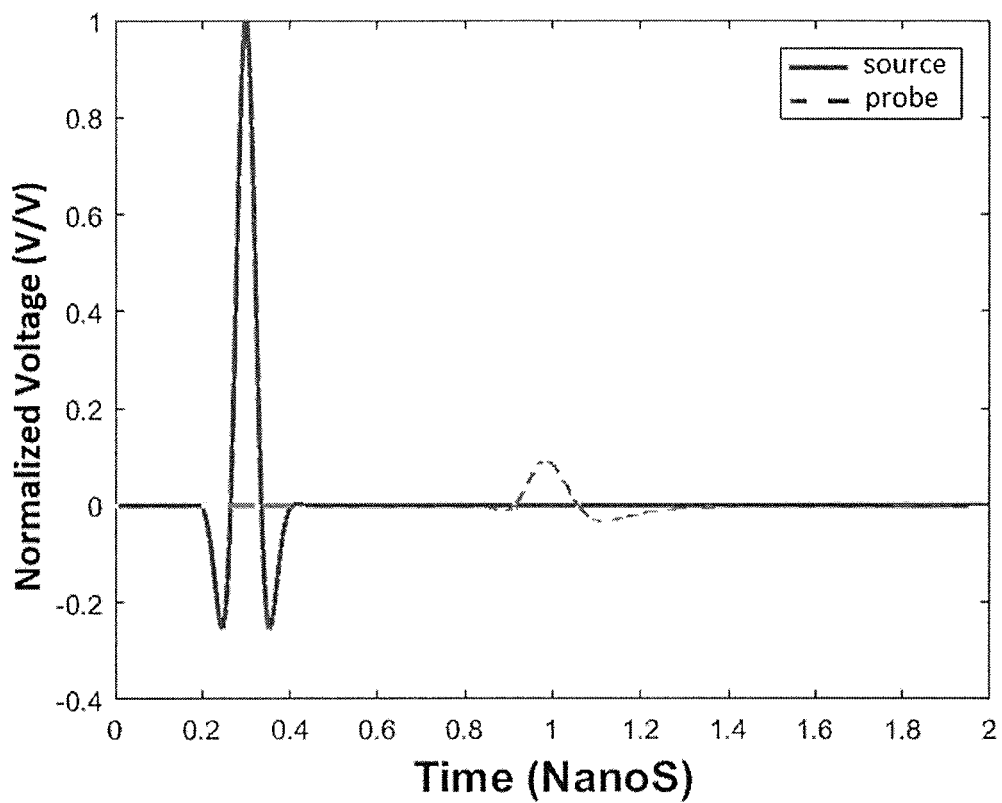
FIG. 7a is used to explain pulse waveform at the source's position and the probe's position (time domain).
Figure 7B:
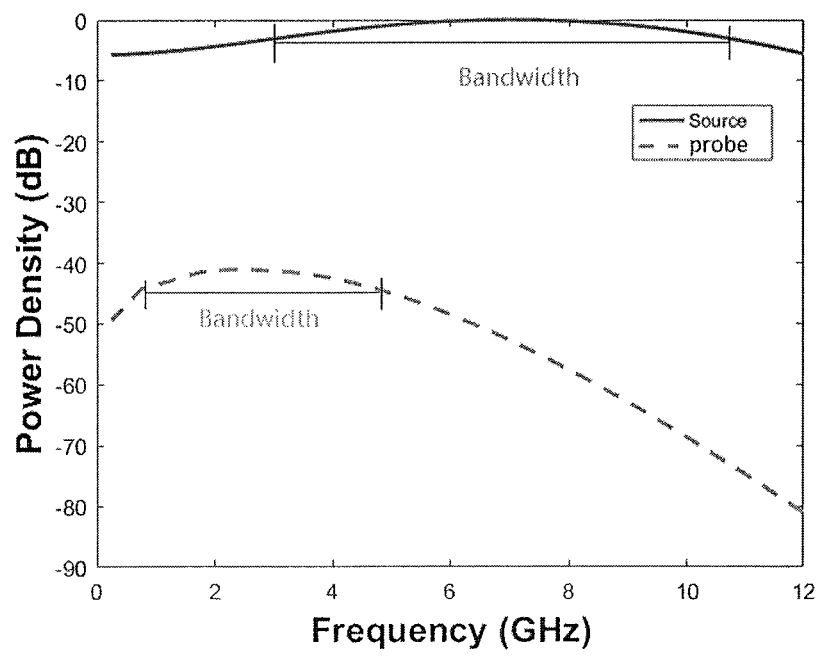
FIG. 7b is used to explain spectrum of the source signal and the observed signal at probe (frequency domain).

A standard UWB pulse having 3-dB bandwidth from 3.1 to 10.6 GHz, with the time domain waveform shown in FIG. 7a (solid) is excited by a point source in the air and a probe was placed 3 cm under the surface of Medium 2 (breast fat tissue) as shown in FIG. 4. The magnitude of the signal observed by the probe (probe signal) is extremely weak compared to the source signal, shown by the dashed line in FIG. 7a. The waveform is distorted, and the width of the main pulse is much wider, implying a reduction in bandwidth. This is verified in FIG. 7b which compares the 3-dB bandwidth of two signals in the frequency domain. As expected, high-frequency components attenuate quickly which causes a shift of the center frequency.

Conventional time-domain UWB radar methods such as DAS use the distorted signal directly, in some sense not a UWB signal any more due to bandwidth being reduced, for image reconstruction. The time-delay compensation is as if the received signal back-shifts to the source's position without changing the shape of the waveform (so the waveform remains distorted). Although the source signal is a UWB signal, what is applied in post-signal processing is a band-reduced signal, which causes the resolution to be worse than expected for a UWB radar imaging.

In the present invention, we asymmetrically compensate the decays due to the loss in the medium—which is, the high-frequency components will get more compensation, and low-frequency components will get less. The compensation will rely on the medium's frequency-dependent dielectric property and the path that each individual component travelled, mathematically represented by the term $e^{j\vec{k}\vec{R}}$ in (1). It is expanded as follows $$e^{j\vec{k}\vec{R}} = e^{j(k-jK)\vec{R}} = e^{j\vec{k}\vec{R}} \cdot e^{K\vec{R}} \quad (5)$$

In (5), the sub-term $e^{j\vec{k}\vec{R}}$ denotes a phase-shift compensation, i.e., a particular frequency component back-shifts to the source's position along the frequency-dependent path $\vec{R}$; sub-term $e^{K\vec{R}}$ denotes a compensation for the amplitude. In the following, (5) is used to compensate the probe signal.

Figure 8A:
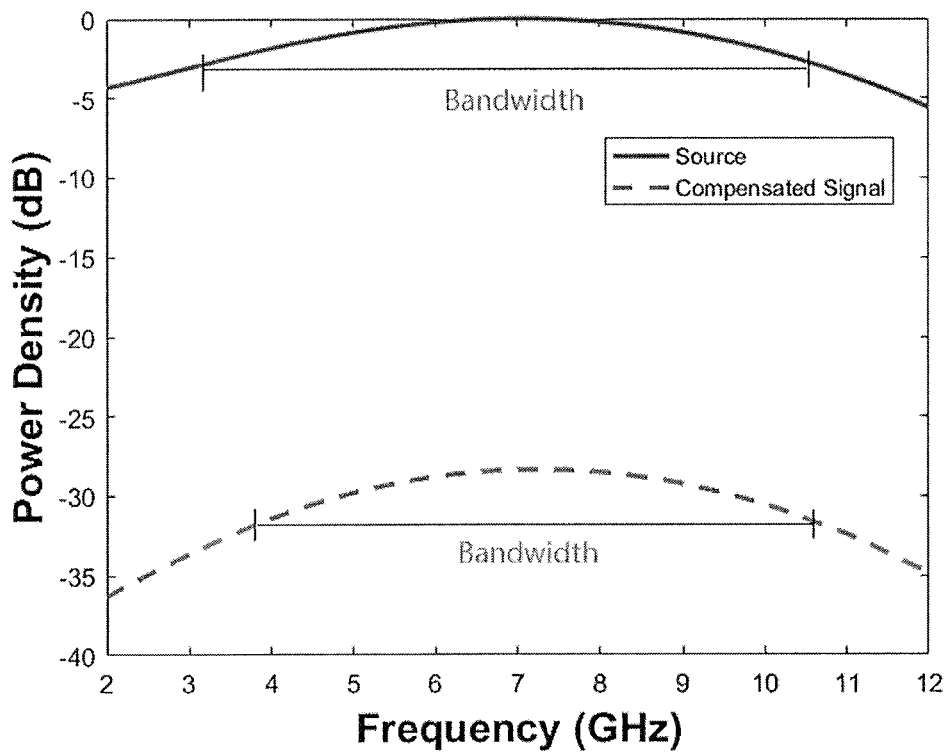
FIG. 8a is used to explain spectrum of the source signal and the compensated signal at probe.
Figure 8B:
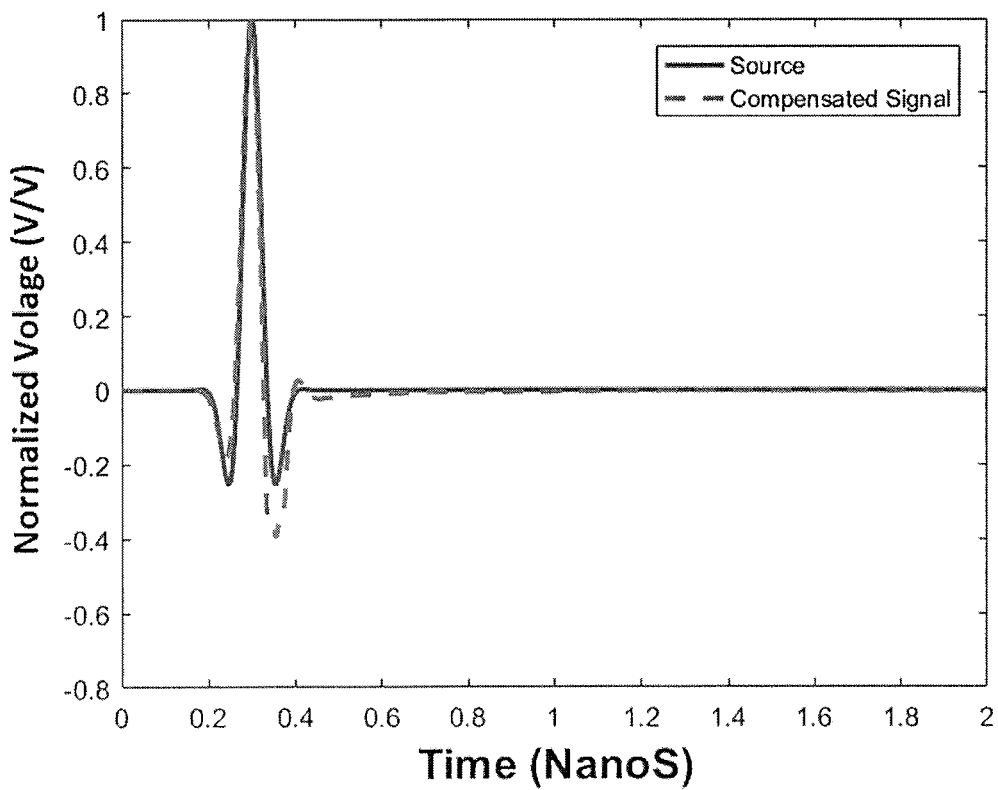
FIG. 8b is used to explain pulse waveform of the source signal and the compensated signal at probe.

Suppose the spectrum of the probe signal is sampled (in frequency domain) from $f_L$ to $f_H$ in a certain frequency increment, and the probe signal is discretized to N frequency components delivered to the compensation procedure:

$$V(f_L)e^{jk_1\vec{R_1}} \cdot e^{K_1\vec{R_1}} \quad (5a)$$
$$\vdots$$
$$V(f_H)e^{jk_N\vec{R_N}} \cdot e^{K_N\vec{R_N}}$$

where the values of k and K are calculated by (3) and (4) respectively. FIG. 8a shows the spectrum of the recovered signal, as well as the spectrum of the source signal for comparison. The high-frequency components are recovered, and the center frequency returns to the original place as in the source signal. Ideally, the recovered spectrum should look like the spectrum of the source signal but appears at a lower dB level caused by power spreading in space, expressed by a $$"\frac{1}{R}"$$

model described in reference [20], where R is the distance away from the source. As an inverse Fourier transform is applied, the time-domain waveform is obtained, and compared with the original source in FIG. 8b. In the time axis, the probe signal shifts back to the source's position in the time axis as expected, and the pulse's width is narrowed due to bandwidth recovery. There are still deviations in the shape of the pulse. A possible reason is that the inverse Fourier transform was carried out only by a limited number of samples from $f_L$ to $f_H$. A better waveform can be achieved by increasing N.

When refractions occur, some energy is reflected so only a portion of the energy enters Medium 2 (FIG. 4). This loss has to be taken into account for compensation when the dielectric properties of two media are significantly different (impedance mismatch). The strength of the refracted wave is frequency dependent, and varies with incident angle. Through the Fresnel's equation, the strength of the refracted wave is solved by $$E_T = \frac{2\cos\theta_i}{\cos\theta_i + n_{21}\cos\theta_t} E_i \quad (6)$$

when the polarization of the electric wave is perpendicular to the incident plane. Here, $E_i$ is the incident wave; $n_{21}$ is the relative index of refraction when the wave is propagating from medium 1 to medium 2, which is frequency dependent $$n_{21}(f) = \frac{v_2(f)}{v_1(f)} \quad (7)$$

$\theta_i$ and $\theta_t$ are incident angle and refraction angle, respectively, which are both frequency dependent, i.e. $\theta_i(f)$ and $\theta_t(f) \cdot v_1$ and $v_2$ are wave velocity in medium 1 and medium 2, respectively. Therefore, the strength of the refracted wave $E_T$ (f) is frequency dependent. (1) can be adjusted to compensate the attenuation due to refraction loss for each frequency individually, which a conventional UWB method is unable to do. The compensation factor is written by $$C(\vec{R}, f) = \frac{E_i}{E_T} = \frac{\cos\theta_i + n_{21}\cos\theta_t}{2\cos\theta_i} \quad (8)$$

where since $\theta_i$ and $\theta_t$ are wave path and frequency dependent, the compensation factor is written as a function of $\vec{R}$ and f. When the polarization of the electric field is parallel to the plane of incidence, $$C(\vec{R}, f) = \frac{E_i}{E_T} = \frac{n_{21}\cos\theta_i + \cos\theta_t}{2\cos\theta_i} \quad (9)$$

Thus, (1) is adjusted to $$I = \int_{f_L}^{f_H} \sum_{Ch=1}^{M \times N} \left(\prod_{m=1}^{n} C_m\right) \cdot e^{jk\vec{R}} \cdot V(f) df \quad (10)$$

where n is the number of refractions when multiple-layer refractions occur.

Figure 9:
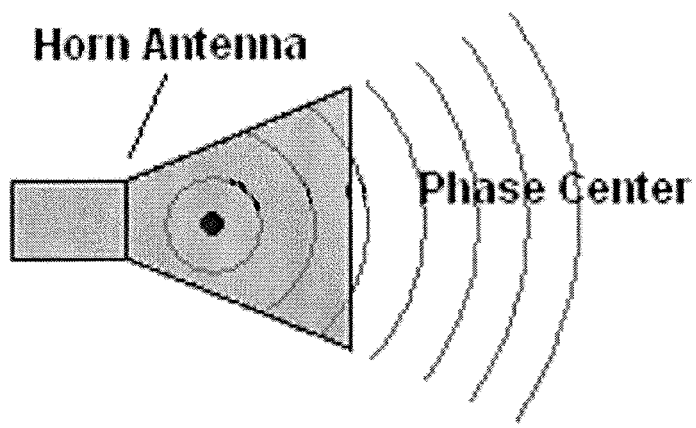
FIG. 9 is used to explain phase center of a horn antenna.

In addition, when the object is in the near field (range ≤2 wavelengths) of an antenna, the dimension of the antenna may be comparable to the electrical range between the object and the antenna, especially when a high-gain antenna (their physical dimension is usually big) is adopted, leading to the ambiguity of the distance and further leading to difficulty in time-shift calculation. Use of an antenna's phase center, which represents a point from which EM radiation spreads outward, may ease the distance calculation. FIG. 9 illustrates the phase center for a horn antenna at a certain frequency. However, the phase center of a UWB antenna is also frequency dependent. Conventional UWB methods are unable to appropriately utilize the phase center to accurately evaluate the distance, but the present invention can.

Figure 10:
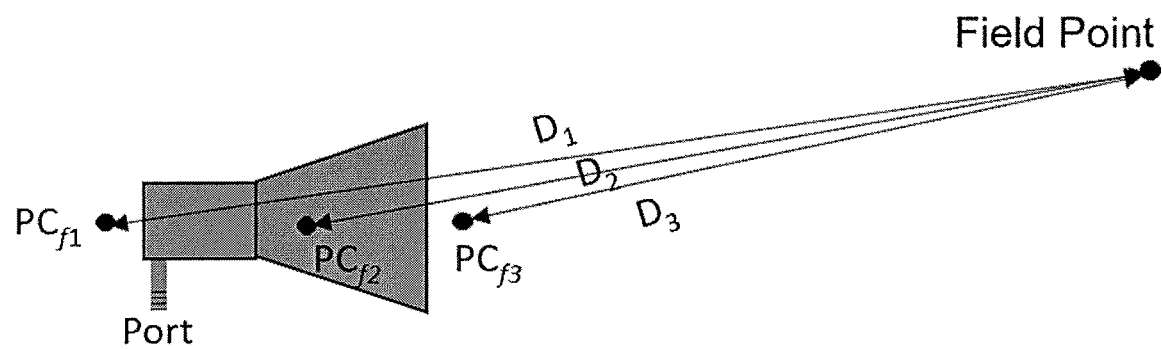
FIG. 10 is used to explain distance from a field point to frequency-dependent phase center of the antenna.

As shown in FIG. 10, phase centers ($PC_{f1}$, $PC_{f2}$, $PC_{f3}$) may be physically located either behind the antenna, or in the antenna, or in front of the antenna. They are employed to calculate the distance ($D_1$, $D_2$, $D_3$) to a field point at corresponding frequencies ($f_1$, $f_2$, $f_3$), and then the phase shift and amplitude decay at each frequency can be precisely computed and compensated by the term $e^{jk\vec{D}_l}$ (l=1, 2, 3) in (1), (5), and (10).

In real measurement, we need to find out the phase shift from the object point to the antenna's port because the signal finally goes to the port. Therefore, in the next step, the phase shift from phase center to the antenna's port is evaluated. We do not need to consider how the wave physically propagates from the phase center (even if it's out of the antenna) to the port (this process is ambiguous because the phase center itself is virtual, which is used to help the calculation). We just need to measure the phase shift between them by a setup of two such antennas: one as a transmitter and the other as a receiver. By measuring the transmission parameter or unwrapped phase delay between the antenna pair using a VNA, the phase shift between the transmitter's port and the receiver's port can be determined (recorded as $Pd_{p-p}$). As the phase center of an antenna can be found in a simulation tool, for instance CST MWS Studio or HFSS, the phase shift between the transmitter's phase center and receiver's phase center can be easily solved by a simple mathematical computation (recorded as $Pd_{c-c}$). Hence, the phase shift from the phase center (at a certain frequency) to the antenna's port is $$Pd = \frac{Pd_{p-p} - Pd_{c-c}}{2} \quad (11)$$

Using the phase center for a phase-shift evaluation, and using the approach for measuring phase shift between phase center and antenna's port, are not limited to horn antennas. They can be used for any UWB antennas.

The embodiments set forth above are merely a few examples of the invention and many variations and modifications within the spirit and scope of the invention are possible, depending on the specific situation or application at hand. The invention is thus not limited to the embodiments described above. The invention is therefore defined with reference to the following claims.

REFERENCES

[1] Q. Zhang and A. Nallanathan, "Delay-Sum Antenna Array Reception for Transmitted-Reference Impulse Radio (TR-IR) System," IEEE Trans. Wireless Commun., vol. 7, no. 12, pp. 5208-5213, 2008.

[2] H. Lim, N. T. T. Nhung, E. Li, and N. D. Thang, "Confocal MW Imaging for Breast Cancer Detection: Delay-Multiply-and-Sum Image Reconstruction Algorithm," IEEE Trans. Biomed. Eng., vol. 55, no. 6, pp. 1697-1704, 2008.

[3] M. R. Bradley, R. J. McCummins Jr., M. P. Crowe, and M. E Duncan, "Ground Penetrating Radar System", U.S. Pat. No. 6,445,334, Sep. 3, 2002.

[4] X. Li and S. C. Hagness, "A Confocal MW Imaging Algorithm for Breast Cancer Detection," IEEE Microw. Wireless Compon. Lett., vol. 11, no. 3, pp 130-132, March 2001.

[5] E. C. Fear, S. C Hagness, P. M. Meaney, M. Okoniewski, M. A. Stuchly, "Enhancing Breast Tumor Detection with Near-Field Imaging," IEEE Microw. Magazine, vol. 3, no. 1, pp. 48-56, March 2002.

[6] Moreira, Alberto; Prats-Iraola, Pau; Younis, Marwan; Krieger, Gerhard; Hajnsek, Irena; P. Papathanassiou, Konstantinos. "A tutorial on synthetic aperture radar". IEEE Geosci. and Remote Sens. Magazine, vol. 1, no: 1, 2013.

[7] Oliver, C. and Quegan, S. Understanding Synthetic Aperture Radar Images. Artech House, Boston, 1998.

[8] Hewlett Packard, "Basics of measuring the dielectric properties of materials," Hewlett Packard literature number 5091-3300E, 1992.

[9] W. E. Patitz, B. C. Brock, and E. G. Powell, "Measurement of Dielectric and Magnetic Properties of Soil," SAND-95-2419, November 1995.

[10] C. Gabriel, S. Gabriel, and E. Corthout, "The dielectric properties of biological tissues: I. Literature survey," Phys. Med. Bio., vol. 41, no. 11, pp. 2231-2249, 1996.

[11] S. Gabriel, R. W. Lau, and C. Gabriel, "The dielectric properties of biological tissues: II. Measurements in the frequency range 10 Hz to 20 GHz," Phys. Med. Bio., vol. 41, no. 11, pp. 2251-2269, 1996.

[12] S. Gabriel, R. W. Lau, and C. Gabriel, "The dielectric properties of biological tissues: Ill. Parametric models for the dielectric spectrum of tissues," Phys. Med. Bio., vol. 41, no. 11, pp. 2271-2293, 1996.

[13] W. Shao, T. R. McCollough, W. J. McCollough, and A. Edalati., "A Phase Confocal Method for Near-Field MW Imaging," U.S. patent application Ser. No. 15/342,368, Nov. 3, 2016.

[14] W. Shao, A. Edalati, T. McCollough, and W. McCollough, "A phase confocal method for MW near-field imaging," *IEEE Trans. Microw. Theory Techn.*, vol. 65, no. 7, pp. 2508-2515, July 2017.

[15] W. Shao, T. McCollough, and W. McCollough, "A phase shift and sum method for UWB radar imaging in dispersive media," submitted to *IEEE Trans. Antennas Propag.*

[16] W. McCollough, T. McCollough, W. Shao, A. Edalati, and J. R. Leslie, "MW imaging device," U.S. Pat. No. 9,869,641.

[17] W. Shao, A. Edalati, T. McCollough, and W. McCollough, "A time-domain measurement system for UWB MW imaging," *IEEE Trans. Microw. Theory and Techn.*, no. 99, pp. 1-11, February 2018.

[18] M. Lazebnik, M. Okoniewski, J. H. Booske, and S. C. Hagness, "Highly Accurate Debye Models for Normal and Malignant Breast Tissue Dielectric Properties at MW Frequencies," IEEE Microw. Wireless Compon. Lett., vol. 17, no 12, pp. 822-824, December 2007.

[19] W. Shao and W. McCollough, "Multiple-GPU-based frequency-dependent finite-difference time domain formulation using MATLAB parallel computing toolbox," *Progress in Electromagnetics Research M*, vol. 60, pp. 93-100, 2017.

[20] E. C. Fear, X. Li, S. C. Hagness, and M. A. Stuchly, "Confocal MW Imaging for Breast Cancer Detection: Localization of Tumors in Three Dimensions," IEEE Trans. Biomed. Eng., vol. 49, no. 8, pp. 812-822, 2002.

All of the above documents are incorporated herein by reference for techniques described therein as well as systems, methods, and other techniques related to MW imaging.

What is claimed is:

1. A system for producing an image, the system comprising:
    a MW (microwave) transmitter, configured to transmit a MW towards an object;
    a MW receiver, configured to detect a MW signal received from the object; and
    a processor programmed to produce an image of the object by (1) compensating both phase shifts and amplitude losses for frequency dependency in a plurality of detected MW signals and (2) using at least one compensation factor due to refraction loss between at least two different mediums,
    wherein the processor is programmed to
    sum detected MW signals compensated for both (1) phase shifts and (2) amplitude losses.

2. The system of claim 1 wherein the MW transmitter comprises a plurality of MW transmitter antennas and the MW receiver comprises a plurality of MW receiver antennas.

3. A method for producing an image, comprising:
    transmitting a MW (microwave) from a MW transmitter towards an object;
    detecting, with a MW receiver, a MW signal received from the object;
    wherein the transmitting and detecting comprises transmitting and detecting at multiple frequencies;
    calculating wave propagation distances from the MW transmitter and the MW receiver to field points using frequencies of transmission;
    calculating phase shifts of MW signals using the frequencies of transmission;
    calculating losses in amplitude of the MW signals using the frequencies of transmission;
    calculating at least one compensation factor due to refraction loss between at least two different mediums using the frequencies of transmission; and
    producing an image of the object using the phase shifts, losses in amplitude, and the at least one compensation factor.

4. The method of claim 3 wherein the wave propagation distance includes a distance of a path a wave propagates from the MW transmitter to a field point and then from the field point to the MW receiver.

5. The method of claim 3 wherein the MW transmitter and the MW receiver comprise UWB (ultra-wide band) antennas.

6. The method of claim 3 wherein the detected MW signal is a signal collected using a vector network analyzer.

7. The method of claim 3 wherein the detected MW signal is a time domain signal collected using an oscilloscope or customized receiver, which is converted to the frequency domain using a Fourier transform.

8. The method of claim 3 wherein the wave propagation distance calculation uses a phase center from the MW transmitter and the MW receiver to field points.

9. The method of claim 8 wherein the phase center of the MW transmitter and the MW receiver is determined using EM simulation software.

10. The method of claim 9 further comprising calculating a phase shift between the MW transmitter's phase center and the MW receiver's phase center.

11. The method of claim 10 further comprising using a vector network analyzer to calculate the phase shift between a MW transmitter's port and a MW receiver's port.

12. The method of claim 11 further comprising calculating the phase shift between the phase center of the MW transmitter or receiver and the port of the MW transmitter or receiver.

13. The method of claim 3 wherein the calculation of wave propagation distance takes different refractions of mediums into account.

14. A microwave imaging system, comprising:
    a processor; and
    a memory storing programs for the processor and data, wherein the data includes at least absorption data representing frequency dependence of microwave absorption; and
    wherein the processor is programmed to
    (1) for each of a plurality of pixels, determine a propagation distance from a transmitter, to the pixel, and then to a receiver,
    (2) for each of the plurality of pixels, determine a phase shift based on the propagation distance for each of a plurality of discrete frequencies,
    (3) for each of the plurality of pixels, determine absorption based on the absorption data and propagation distance for each of the plurality of discrete frequencies,
    (4) for each of the plurality of pixels, generate a pixel value of that pixel by combining measured scattered field values at the plurality of discrete frequencies, the measured scattered field values compensated for frequency dependent phase shift, and frequency dependent absorption, and refraction loss between at least two different mediums using frequencies of transmission, and
    (5) producing a microwave image comprised of the plurality of pixel values.

15. The system of claim 14 wherein determining a propagation distance from a transmitter, to a pixel, and then to a receiver considers frequency dependent dielectric properties of at least two different mediums and a frequency dependent phase center.

* * * * *